United States Patent [19]

Naber et al.

[11] Patent Number: 5,556,889
[45] Date of Patent: Sep. 17, 1996

[54] PREPARATION OF RECYCLATE POLYOLS

[75] Inventors: Bernhard Naber; Maritta Lezius, both of Schwarzheide, Germany

[73] Assignee: BASF Schwarzheide GmbH, Schwarzheide, Germany

[21] Appl. No.: 565,207

[22] Filed: Oct. 6, 1995

[51] Int. Cl.⁶ .................................................. C08J 11/04
[52] U.S. Cl. .................................................. 521/49.5
[58] Field of Search .................................... 521/49.5

[56] References Cited

U.S. PATENT DOCUMENTS 4,316,992  2/1982  Gerlock et al. ................... 521/49.5
5,274,004  12/1993  van der Wal et al. ............ 521/49.5
5,300,530  4/1994  Machado et al. .................. 521/49.5

Primary Examiner—Morton Foelak
Attorney, Agent, or Firm—Paul L. Marshall

[57] ABSTRACT

The invention relates to a process for the preparation of recyclate polyols by reacting rigid polyurethane foam with short-chain hydroxyl-containing compounds, which comprises adding at least one epoxidized native fatty oil to the reaction mixture after glycolysis at a temperature from 10° to 80° C. below the glycolysis temperature.

11 Claims, No Drawings

PREPARATION OF RECYCLATE POLYOLS

The present invention relates to a process for the preparation of recyclate polyols by glycolysis of rigid polyurethane foams.

Polyurethanes are versatile plastics which are produced in large amounts. Particular importance is attached to rigid polyurethane foams (abbreviated to "PUR-RF" below). Their good heat insulation capacity means that they are frequently used for thermal insulation, for example in the construction industry or in the refrigeration industry. One problem encountered in the use of PUR-RFs is that, owing to their crosslinking, they can only be recycled by chemical means.

Thus, it is known to break down polyurethane by chemical processes and to re-use these breakdown products for the preparation of polyurethanes.

One method is to break down polyurethanes using polyhydric alcohols, known as glycolysis. This process has already been described in a number of patents, for example DE-A-2 516 863, DE-A-2 557 172, DE-C-3 702 495, U.S. Pat. Nos. 3,109,824, 3,404,103 and DE-A-4 234 335.

The water content of the alcohol and the residual moisture in the polyurethanes employed mean that these glycolysis processes also give the amines on which the isocyanates are based. However, aromatic amines are suspected carcinogens and must therefore be removed from the reaction mixture.

EP-A-592 952 describes a glycolysis process in which the aromatic amines formed during glycolysis are reacted with glycidyl ethers and thus rendered safe.

Glycolysis of PUR-RF gives glycolysis polyols which have high acid numbers, of above 2 mg of KOH/g, in addition to a content of aromatic amines, in particular diphenylmethane diamine (MDA) and its higher homologs. The deamination process disclosed in EP-A-592 952 does not reduce the acid number of these recyclate polyols.

It is an object of the present invention to provide a simple and economical process for the glycolysis of PUR-RF which does not use toxic or other hazardous materials and gives a recyclate polyol which can be used directly as such for the preparation of polyurethanes, has an MDA content of significantly below the characteristic of 0.1% by weight and an acid number of less than 1 mg of KOH/g and whose viscosity does not exceed the value 5,000 mPas at 25° C.

We have found that this object is achieved by a process for the preparation of recyclate polyols by reacting PUR-RF with short-chain hydroxyl-containing compounds, which comprises adding at least one epoxidized native fatty oil to the reaction mixture after the reaction.

The present invention accordingly provides a process for the preparation of recyclate polyols by reacting PUR-RF with short-chain hydroxyl-containing compounds, which comprises adding at least one epoxidized native fatty oil to the reaction mixture after the reaction.

The present invention furthermore provides the recyclate polyols prepared by this process and their use for the preparation of polyurethanes.

In order to carry out the novel process, the PUR-RF, usually in comminuted form, is mixed with the short-chain hydroxyl-containing compounds. The comminution of PUR-RF can be carried out, for example, by grinding, cutting or breaking.

In order to achieve good homogenization of the reaction mixture, it is advantageous to introduce the short-chain hydroxyl-containing compound into the reactor and to warm it to a temperature sufficient to dissolve the PUR-RF. In general, the PUR-RF is added at a temperature $T_1$ of from 190° to 240° C., preferably from 200° to 230° C. The maximum amount of added PUR-RF is determined by the solubility of the PUR-RF in the short-chain hydroxyl-containing compound. This maximum amount of PUR-RF can easily be determined by simple preliminary experiments.

In general, a mixing ratio between PUR-RF and short-chain hydroxyl-containing compound of from 0.3 to 1.8:1 is used. Higher PUR-RF contents usually result in a considerable increase in the viscosity of the glycolysis polyols.

After complete homogenization of the reaction batch, it is warmed to the glycolysis reaction temperature. This is generally below the addition temperature. Glycolysis temperatures $T_2$ of from 180° to 210° C., preferably from 190° to 200° C., are usual. It is advantageous to select the glycolysis temperature so that it is at least 15 degrees below the temperature of addition of the PUR-RF to the short-chain hydroxyl-containing compound in order to suppress side reactions. This temperature is maintained until the PUR-RF has reacted completely with the short-chain hydroxyl-containing compound, which is evident from the establishment of constant viscosity. At the batch ratios usual in practice, the reaction time is from 120 to 240 minutes.

When the reaction is complete, the reaction mixture is cooled to a temperature $T_3$ of from 130° to 180° C. and kept at this temperature for from 10 to 60 minutes. During this time, the epoxidized native fatty oil is added. A higher addition temperature results in side reactions of the epoxidized native fatty oil, while a lower addition temperature reduces the reaction rate of the reaction excessively. The reaction mixture is then cooled.

If desired, this can be followed by work-up of the recyclate polyol, for example by filtration.

The PUR-RF used can be scrap, for example from the construction industry, but in particular from scrapped refrigeration equipment. Large amounts of PUR-RF are obtained from the recycling and scrapping of refrigeration equipment. Its low degree of soiling and its homogeneous composition mean that such scrap is highly suitable for glycolysis.

Before the glycolysis, it is advantageous, in order to achieve better handling and a reduction in volume, to compact the scrap and, in the case of polyurethane foams, to remove any blowing gases which may be present.

In principle, the short-chain hydroxyl-containing compounds can be any alcohols with a functionality of two or more.

Particularly advantageous for the novel process are difunctional alcohols. The alcohols can be used individually or as mixtures.

Preference is given to ethylene glycol and its higher homologs, in particular diethylene glycol, and propylene glycol and its higher homologs, in particular dipropylene glycol, individually or as mixtures with one another.

These glycols give a glycolysis polyol having particularly favorable properties, in particular with respect to reactivity and viscosity.

The epoxidized native fatty oils used are products obtained from at least monounsaturated, preferably at least triunsaturated natural oils, for example from soybean oil, linseed oil, rapeseed oil and nut oils of all types. The term "unsaturated" here is taken to mean a carbon-carbon double bond.

The epoxidized native fatty oils are added to the reaction mixture is an amount of from 1 to 15% by weight, preferably from 2 to 10% by weight.

The glycolysis polyols prepared by this process are distinguished by low amine contents and low acid numbers. They can be converted back into polyurethanes without additional treatment. Owing to their high functionality, they are usually converted back into rigid polyurethane foams.

To this end, they are reacted alone, but preferably in a mixture with other hydroxyl-containing compounds, with polyisocyanates in the presence of conventional blowing agents, catalysts, auxiliaries and additives.

Since the novel glycolysis polyols have very low viscosities, they can also advantageously be employed for CFC-free rigid foam systems.

The invention is explained in greater detail with reference to the examples below:

EXAMPLES 1 to 7 (according to the invention)

Diethylene glycol was introduced into a 2 l round-bottom flask fitted with stirrer, dropping funnel, thermometer and reflux condenser and heated to temperature $T_1$. When this temperature was reached, PUR-RF of unknown composition obtained from scrapped refrigeration equipment and pre-comminuted in a cutting mill was introduced into the flask with stirring. When the PUR-RF had dissolved in the diethylene glycol, the reaction mixture was warmed to temperature $T_2$ and kept at this temperature.

The temperature was then reduced to 150° C., where it was kept for 30 minutes, during which the epoxidized native fatty oil was added.

When the addition was complete, the reaction mixture was cooled to room temperature, and the resultant glycolysis polyol was analyzed.

The precise amounts, temperatures, times and analytical results are shown in the table.

The hydroxyl number was determined in accordance with DIN 53 240, the viscosity was determined at 25° C. in accordance with DIN 53 214, the acid number was determined in accordance with DIN 53 402 and the aromatic amine content, calculated as MDA, was determined by HPLC.

EXAMPLE 8 (comparison)

The procedure was similar to that in Examples 1 to 7, but no native fatty oil was added to the reaction mixture, and the reaction mixture was not kept at 150° C. for 30 minutes.

glycolysis at a temperature from 10° to 80° C. below the glycolysis temperature.

2. A process as claimed in claim 1, wherein the glycolysis is carried out at from 180° to 210° C. and the addition of the epoxidized native fatty oil is carried out at from 130° to 180° C.

3. A process as claimed in claim 1, wherein the glycolysis is carried out at from 190° to 200° C. and the addition of the epoxidized native fatty oil is carried out at from 140° to 160° C.

4. A process as claimed in claim 1, wherein the epoxidized native fatty oil is selected from the group consisting of epoxidized rapeseed oil, epoxidized castor oil and epoxidized nut oils.

5. A process as claimed in claim 1, wherein the epoxidized native fatty oil is added in an amount of from 1 to 15% by weight, based on the total weight of rigid polyurethane foam and short-chain hydroxyl-containing compounds.

6. A process as claimed in claim 1, wherein the epoxidized native fatty oil is added in an amount of from 2 to 10% by weight, based on the total weight of rigid polyurethane foam and short-chain hydroxyl-containing compounds.

7. The process as claimed in claim 2, wherein the epoxidized native fatty oil is selected from the group consisting of epoxidized rapeseed oil, epoxidized castor oil and epoxidized nut oils.

8. The process as claimed in claim 7, wherein the epoxidized native fatty oil is added in an amount of from 1 to 15 percent by weight, based on the total weight of rigid polyurethane foam and short-chain hydroxyl-containing compounds.

9. The process as claimed in claim 8, wherein the epoxidized native fatty oil is added in an amount of from 2 to 10 percent by weight, based on the total weight of rigid polyurethane foam and short-chain hydroxyl-containing compounds.

10. A method for the preparation of polyurethanes, comprising reacting a recyclate polyol with polyisocyanates, said recyclate polyol comprising the reaction product of a rigid polyurethane foam with a short-chain hydroxyl-containing compound, to which is added at least one epoxidized native fatty oil to the reaction product after glycolysis at a

TABLE

| Ex. | PUR-RF [kg] | DEG[1] [kg] | $T_1$ [°C.] | [min] | $T_2$ [°C.] | [min] | Oil Type | [% by wt.] | Hydroxyl number [mg KOH/g] | Acid number [mg KOH/g] | Amine content [% MDA][2] | Viscosity 25° C. [mPa · s] |
|---|---|---|---|---|---|---|---|---|---|---|---|---|
| 1 | 0.4 | 1.0 | 215–225 | 40 | 190–200 | 200 | A | 3.0 | 604 | 0.680 | 0.020 | 1543 |
| 2 | 1.0 | 1.0 | 225–235 | 55 | 190–200 | 185 | A | 2.5 | 557 | 0.240 | 0.015 | 3448 |
| 3 | 1.0 | 1.0 | 215–225 | 90 | 190–200 | 150 | A | 5.0 | 579 | <0.01 | 0.030 | 2490 |
| 4 | 1.0 | 1.0 | 225–235 | 65 | 190–200 | 175 | A | 5.0 | 599 | 0.181 | 0.038 | 2154 |
| 5 | 1.0 | 1.0 | 215–225 | 50 | 190–200 | 165 | B | 4.0 | 565 | <0.01 | 0.024 | 2885 |
| 6 | 1.0 | 1.0 | 220–230 | 60 | 190–200 | 130 | C | 7.0 | 572 | 0.051 | 0.073 | 2423 |
| 7 | 1.0 | 1.0 | 200–210 | 65 | 190–200 | 145 | D | 10.0 | 520 | <0.01 | 0.55 | 2583 |
| 8 | 1.0 | 1.0 | 215–225 | 80 | 190–200 | 150 | — | — | 620 | 2.59 | 0.84 | 5988 |

[1]Diethylene glycol
[2]Based on the total weight of PUR-RF + DEG
A Epoxidized soybean oil
B Epoxidized linseed oil
C Epoxidized rapeseed oil
D Epoxidized castor oil

We claim:

1. A process for the preparation of recyclate polyols by reacting rigid polyurethane foam with short-chain hydroxyl-containing compounds, which comprises adding at least one epoxidized native fatty oil to the reaction mixture after temperature from 10° to 80° C. below the glycolysis temperature.

11. The process of claim 10, wherein said polyurethane is a rigid polyurethane foam.

* * * * *